(12) United States Patent
Barney

(10) Patent No.: US 10,007,818 B2
(45) Date of Patent: Jun. 26, 2018

(54) MULTI-POSITION RFID SWITCH

(71) Applicant: STANLEY INDUSTRIAL AND AUTOMOTIVE, LLC, Westerville, OH (US)

(72) Inventor: Clifford Barney, Acworth, GA (US)

(73) Assignee: STANLEY INDUSTRIAL AND AUTOMOTIVE, LLC, Westerville, OH (US)

( * ) Notice: Subject to any disclaimer, the term of this patent is extended or adjusted under 35 U.S.C. 154(b) by 0 days. days.

(21) Appl. No.: 15/405,892

(22) Filed: Jan. 13, 2017

(65) Prior Publication Data

US 2017/0206385 A1    Jul. 20, 2017

Related U.S. Application Data

(60) Provisional application No. 62/278,696, filed on Jan. 14, 2016.

(51) Int. Cl.
*G06K 7/10* (2006.01)
*G06K 19/07* (2006.01)
*G06K 19/077* (2006.01)

(52) U.S. Cl.
CPC ..... *G06K 7/10366* (2013.01); *G06K 19/0723* (2013.01); *G06K 19/07701* (2013.01)

(58) Field of Classification Search
None
See application file for complete search history.

(56) References Cited

U.S. PATENT DOCUMENTS

| | | | | |
|---|---|---|---|---|
| 6,163,538 A | * | 12/2000 | Brown | G06K 7/10851 |
| | | | | 370/349 |
| 6,959,862 B2 | * | 11/2005 | Neumark | G06K 17/0022 |
| | | | | 235/383 |
| 7,036,729 B2 | * | 5/2006 | Chung | H04L 63/12 |
| | | | | 235/383 |
| 7,336,186 B2 | | 2/2008 | Noguchi | |
| 8,561,911 B2 | | 10/2013 | Mullis et al. | |
| 8,933,787 B2 | * | 1/2015 | Hinman | G06K 19/07327 |
| | | | | 340/10.1 |
| 9,324,015 B2 | * | 4/2016 | Wu | G06K 19/06 |
| 9,424,449 B2 | | 8/2016 | Erez et al. | |
| 2009/0303013 A1 | | 12/2009 | Edgerton | |

\* cited by examiner

*Primary Examiner* — K. Wong
(74) *Attorney, Agent, or Firm* — Michael P. Leary

(57) ABSTRACT

An RFID switch manually operable for transmitting status data includes a plurality of RFID tags that a user can selectively expose to or shield from activation by an RFID reader. The user's choice of which RFID tags are exposed for reading determines what status information is conveyed to the RFID system. A data base in the RFID system associates the presence or absence of particular RFID tags with corresponding status reports.

7 Claims, 6 Drawing Sheets

MULTI-POSITION RFID SWITCH

CROSS-REFERENCE TO RELATED APPLICATION

This application claims priority from U.S. Provisional Patent Application No. 62/278,696, filed on Jan. 14, 2016, the disclosure of which is incorporated herein by reference.

BACKGROUND OF THE INVENTION

The present invention is generally related to the field of monitoring and controlling objects, and more particularly, to systems, devices, and methods for remotely monitoring and controlling objects using radio frequency identification (RFID) technology.

A summary of various terms used herein is provided below, followed by a brief overview of known object status tracking systems. RFID refers to technology that uses radio waves to automatically identify people or objects. An object refers to any item used in a facility, work environment, or the like, the presence of which is required to perform work functions such as assembly, processing, design, testing, cleaning, organizing, etc. Examples of objects include hand tools, material handling equipment, parts to be assembled, finished goods, safety equipment, reels of cable, calibration equipment, etc.

The simplest RFID system contains three principal components: an RFID reader, an RFID antenna, and an RFID tag. An RFID reader is a radio transceiver that transmits and receives specifically formatted messages within a certain frequency range. It alternates between 'transmit' mode and 'receive' mode. An RFID antenna is physically connected to the RFID reader and alternates between transmitting and receiving radio communications. An RFID tag is a solid-state electronic device consisting of a microprocessor and a radio antenna. There are three main types of RFID tags: passive, active, and semi-active. Passive RFID tags contain no power source; they are powered by incident radio waves from the RFID reader. Active tags contain an internal power source such as a battery for microprocessor and transmit functions. Semi-active tags use an internal power source to only run the microprocessor. Passive and semi-active tags do not technically transmit responses back to an RFID reader; rather, they retransmit or backscatter the incoming (incident) radio signal in such a way that the RFID reader is able to uniquely identify a particular tag.

RFID tags are manufactured in a variety of form factors to suit different purposes. For the purposes of disclosing the particulars of this invention, two RFID tag form types are discussed: 1) inlay RFID tags and 2) encapsulated RFID tags. An inlay RFID tag is a simple form factor consisting of an RFID chip and a metallic foil antenna affixed to a thin, flexible substrate such as paper, often printed as adhesive labels. Inlay RFID tags are widely used to track documents and shelved inventory because of their low cost. An inlay RFID tag is typically thin, with a thickness of around $\frac{1}{10}$ millimeter. However, inlay RFID tags are not suitable for harsh environments because they are easily damaged by abrasion, liquids, bending, and extremes of temperature and humidity. For harsh environments, encapsulated RFID tags are used. In this type, the chip and antenna are protected within a hardened enclosure, often plastic or ceramic, which protects the tag from damage. This form type also allows for non-flat antenna shapes, which can enhance readability and detection range. An encapsulated RFID tag is generally thick, with a thickness greater than 1 millimeter. A popular shape for encapsulated RFID tags is a rectangular prism.

Certain materials can block or shield the propagation of radio signals to an RFID tag, rendering them undetectable. Such RF opaque materials are termed radio frequency (RF) masking materials. Most metals are RF masking materials, as are many liquids. Certain metamaterials such as carbon impregnated plastic can also act as RF masking materials. RF masking materials are also available as paints, powders, textiles, and foils. Many other materials are transparent to radio waves, or nearly so, and are termed RF transparent materials. Many plastics, ceramics, and textiles are RF transparent materials.

RFID tags are widely used throughout industry to track assets and monitor industrial processes. Typically this involves physically attaching an RFID tag to an object (tagging the object) and entering that pairing in an information storage and retrieval system (ISRS) such as a database. RFID readers and antennas strategically located throughout a workspace continuously interrogate nearby RFID tags, sending information about detected tags to said ISRS. Certain components of said ISRS use collected RFID data to populate a computer user interface with information about RFID-tagged objects. RFID technology is used to track objects by directly affixing an RFID tag to each object, and then recording that association in an information storage and retrieval system (ISRS), e.g. a database. In a typical RFID-based object tracking system, given a sufficient number of RFID antennas connected to strategically placed RFID readers, two types of data can be extracted: 1) the presence or absence of an object, and 2) the approximate location of an object.

Depending upon the design of an RFID tracking system, the presence or absence of an RFID-tagged object within the read range of specific antennas can be determined, from which an approximate location and movement history can be derived.

Conventional RFID tags simply respond to interrogations within their designed frequency ranges. Oftentimes, however, it is desirable for more detailed information about an RFID-tagged object's status to be made known to the ISRS to facilitate optimal decision-making. For example, an RFID-tagged object may need additional inspection, or may be missing a part, or may require special handling, etc. RFID tags capable of storing and transmitting additional status information can also be useful to extend control of objects and processes in a workplace. For example, RFID conveyed status information/data could be used to turn on/off lights, sensors, machinery, or to modify a process such as an assembly line.

Although it is possible to write limited user-defined data to certain types of RFID tags, many users engage read/write-lock controls for security purposes. Furthermore, writing user-defined data to an RFID tag requires the use of an RFID reader and specialized training. Directly writing data to an RFID tag as a means of conveying the status of an RFID-tracked object adds delay, cost and complexity which disadvantages for the rapid pace of a workplace.

Since the RFID-tagged object is already within proximity of an RFID system, an improved RFID-based system for quickly, simply, and cheaply changing and conveying the status of RFID-tagged objects would enhance the overall value of RFID tracking systems.

SUMMARY OF THE INVENTION

By associating more than one RFID tag with an RFID-tagged object, selective masking and unmasking of said RFID tags can convey the status of said object. Typically the RFID tag associated with an object is a presence/absence indicator, from which can be derived knowledge about whether the object is within the workspace, and its approximate location. A second RFID tag could also be associated with an RFID-tagged object to provide status indications in a true/false (or on/off) manner, examples including: 1) object needs inspection, 2) object is ready to ship, 3) object needs repair, 4) object needs calibration, 5) object is damaged, etc.

The present invention provides various method and apparatus embodiments related to RFID switching.

One method embodiment, among others, includes receiving an excitation signal at a multi-position switch associated with a plurality of radio frequency identification (RFID) tags and a radio frequency (RF) masking enclosure, and orienting the RFID tags with respect to the RF masking enclosure such that a single tag is rendered detectable by a nearby RFID reader.

One apparatus embodiment, among others, comprises a first member comprising an RF masking enclosure employing an opening or RF transparent window by which only an RFID tag can be detected, a second member in rotational relationship inside the first member and a multitude of RFID tags coupled to the second member such that a specific RFID tag associated with a desired status report can be selected to be detectable, while all other RFID tags are rendered undetectable.

Other systems, devices, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the invention can be better understood by referencing the following drawings. The components in each drawing are not necessarily to scale, emphasis instead being placed upon clearly illustrating the principles of the invention. Moreover, like reference numerals designate corresponding parts through the several views.

DESCRIPTION OF THE PREFERRED EMBODIMENTS

Disclosed herein are various embodiments of systems, devices, and methods by which status about an RFID-tagged object can be conveyed using radio frequency identification (RFID) technology. Such systems, methods, and devices are herein referred to generally as object status tracking systems.

By associating more than one RFID tag with an RFID-tagged object, selective masking and unmasking of said RFID tags can provide useful functionality for conveying the status of said object. Typically the RFID tag associated with an object is a presence/absence indicator, from which can be derived knowledge about whether the object is within the workspace, and its approximate location. A second RFID tag could also be associated with an RFID-tagged object to provide status information, in addition to and different from the presence/absence or location information previously discussed, by turning that status tag on or off (that is by shielding or exposing it to interrogation by the RFID reader), status examples including: 1) object needs inspection, 2) object is ready to ship, 3) object needs repair, 4) object needs calibration, 5) object is damaged, etc.

Figure 6:
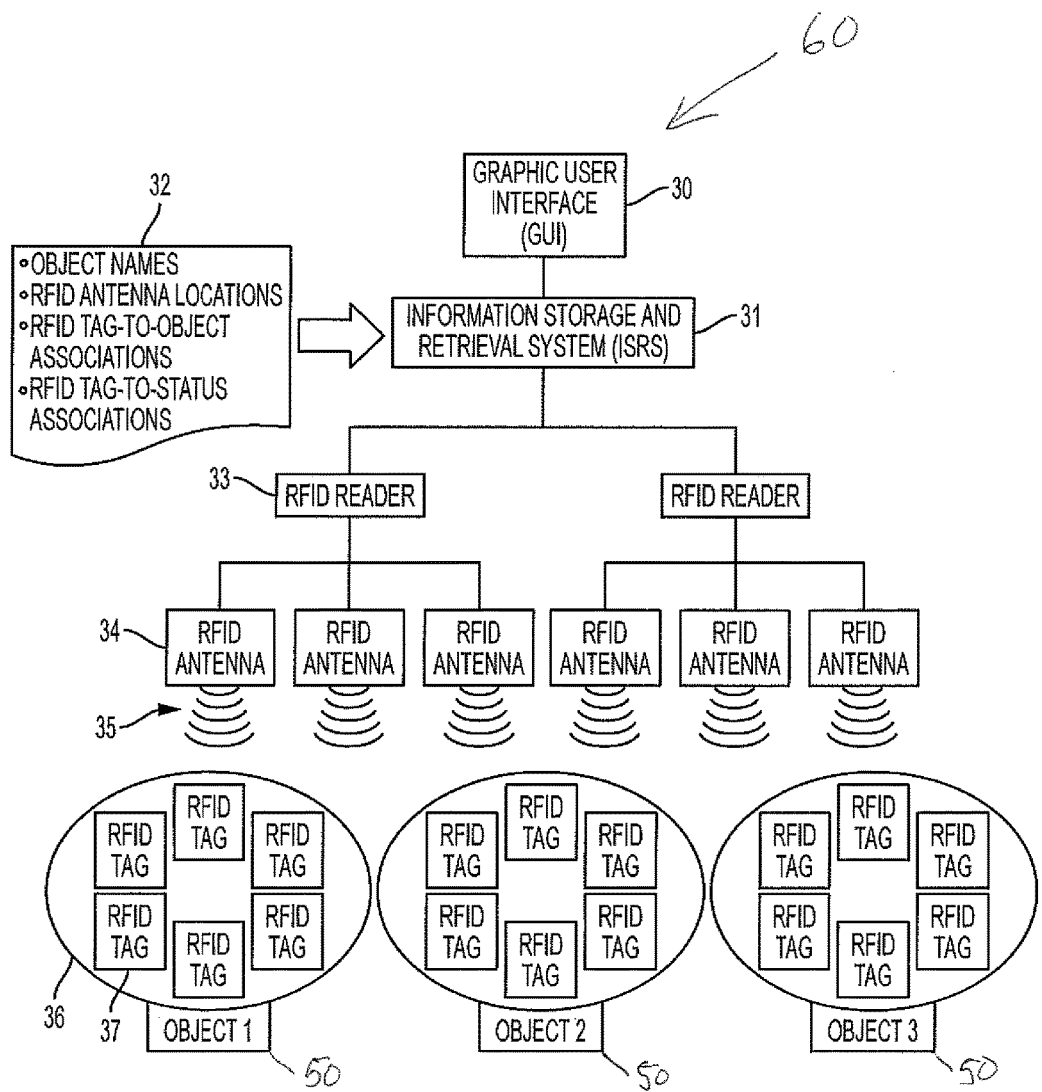
FIG. 6 is a schematic diagram of an object tracking Information Storage and Retrieval System (ISRS) according to the present invention.

With reference to FIG. 6, the underlying functionality and architecture of an object tracking system, according to the invention can be generally described as follows. An ISRS 31 is programmed with certain information 32 about the status of objects 50 to be tracked via RFID. It associates multiple RFID tags 37 with each object 50, each RFID tag 37 being associated with a particular state or status such as 'needs repair', 'ready to ship', or 'out for calibration'. A multi-position RFID switch 36 containing a plurality of RFID tags 37 is affixed to an object 50. Each tag is uniquely selectable using a finger-operated lever 5. Each of the tags 37 within the switch 36 responds with a unique code which is programmed into the ISRS 31. The switch 36 is designed such that individual RFID tags 37 are operator selectively detectable. In a limiting example only a single RFID tag is detectable at any time, the remainder being rendered undetectable by use of rotating RF masking material. A plurality of RFID readers 33, each connected to a plurality of RFID antennas 34, is in continuous operation, alternately transmitting and receiving signals 35 to/from RFID tags 37. Each detectable tag 37 responds with a unique code, which is captured by an RFID reader 33. The RFID readers 33 are in frequent communication with the ISRS 31, which interprets each tag's code 32 and associates it to both an object 50 and a status 32. It then interprets the RFID reader 33 and RFID antenna 34 associated with the response and determines the object's 50 approximate location.

Assume that a user needs to change the status of an RFID-tagged object 50 from, for example, 'Hold', to 'Ready'. He or she flips the lever 5 on the multi-position RFID switch 36 from 'Hold' to 'Ready'. The RFID tag 37 associated with 'Hold' ceases responding, while the RFID tag 37 associated with 'Ready' starts responding. Nearby RFID readers 33 communicate this information to the ISRS 31, which interprets new response data as a change in the status of that object 50.

Having described generally one embodiment of an object status tracking system, what follows is a detailed description of several embodiments of a multi-position RFID switch.

Figure 1:
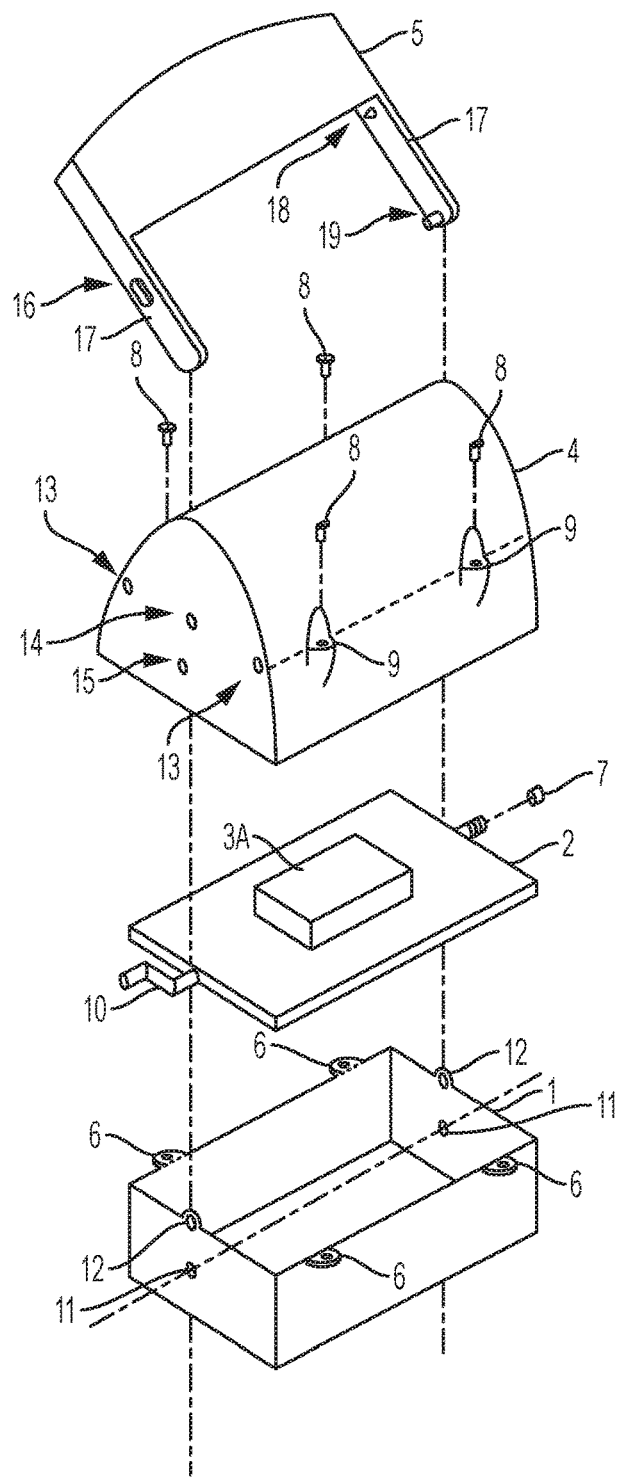
FIG. 1 is an exploded isometric view of one embodiment of a two-position RFID switch.

Referring to FIG. 1, shown is one embodiment of an RFID switch comprising a switch base 1, rotating plate 2, assembly cover 4, and lever 5, henceforth termed a 'two-position RFID switch'. In a preferred embodiment, switch base 1 is a box-shaped container stamped from sheet metal. In a preferred embodiment, rotating plate 2 is rectangular, stamped from sheet metal, with length slightly smaller than the interior length of switch base 1, and with width slightly less than twice the interior height of switch base 1. Two RFID tags 3 are coupled to the rotating plate 2, one on each side, with the center point of each tag coinciding with the center point of the rotating plate 2. An axle 10 is coupled to the rotating plate 2 coinciding with a line bisecting the rotating plate along its longest dimension. Both ends of the axle 10 extend some distance beyond the rotating plate 2. Each end of the axle 10 fits into one of the holes 12 on the upper portion of the switch base 1. One end of axle 12 comprises two bends such that a crankshaft is formed, with the outer end parallel to the line formed by the greater portion of axle 12. The opposite end of axle 12 is unbent. Rotating plate 2 is coupled to switch base 1 by inserting either end of axle 10 into holes 12 on the upper portion of the switch base 2. By this means, the rotating plate 2 forms a lid that precisely covers the switch base 1, and can rotate 360 degrees freely about axle 10. To keep the rotating plate 2 from coming loose, a cap 7 is coupled to the unbent end of axle 10.

An assembly cover 4 is coupled to the switch base 1 by a plurality of fasteners 8 pushed through cover holes 9 and fastened to base holes 6. The assembly cover 4 is shaped such that, when coupled to the switch base 1, the rotating plate 2 can freely rotate 360 degrees. The assembly cover 4 is formed from an RF-transparent material. In a preferred embodiment, the assembly cover 4 is stamped, molded, or otherwise formed from plastic. A portion of the assembly cover 4 is somewhat visibly transparent (shown in FIG. 1 as the upper portion above the dotted line) such that surface features of the rotating plate 2 can be discerned by the user/operator. In a preferred embodiment, the opposite sides of rotating plate 2 are two different colors such as red and green, such that the operator is presented with positive indication of switch selection. In another preferred embodiment, the opposite sides of rotating plate 2 are labeled with words or symbols representing the switch selection affixed to the surface, such that the operator is presented with positive indication of switch selection and the status data that will be transmitted. A hole 14 drilled through one side of the assembly cover 4 coincides with one of the holes 12 on the switch from which the bent portion of the axle 10 protrudes.

A lever 5 comprises two arms 17 each with a pivot protrusion 19 extending inwards towards one another, said pivot protrusions coupling inserted into and through holes 15 on assembly cover 4, and into holes 11 on switch base 1. By this means the lever 5 is causes to rotate around a line extending between holes 11. The bent portion of the axle 10 extends through a channel 16 cut through one of the arms 17 of lever 5, by which means the rotating plate 2 is caused to rotate when the lever 5 is rotated. The dimensions of the channel 16 are such that the rotating plate 2 can be rotated through a range of 180 degrees, corresponding to both sides of the rotating plate 2. When fully rotated in one direction or the other, detent protrusions 18 located on arms 17 fit into depressions 13 located on the exterior of cover 4, causing the lever to snap into position and remain there until moved.

Figure 2A:
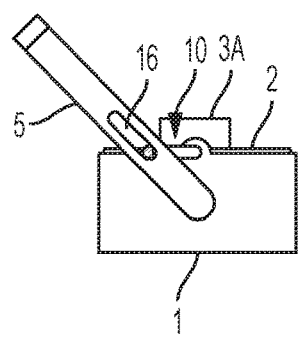
FIGS. 2A through 2E are a series of side views depicting the sequence of steps in operating the embodiment of a two-position RFID switch according to FIG. 1.
Figure 2B:
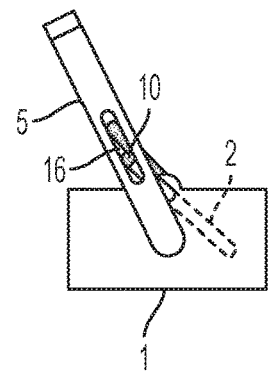
Figure 2C:
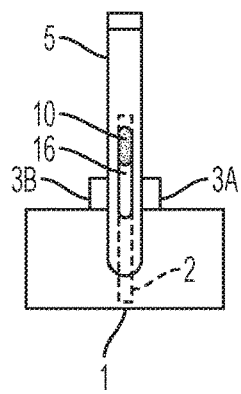
Figure 2D:
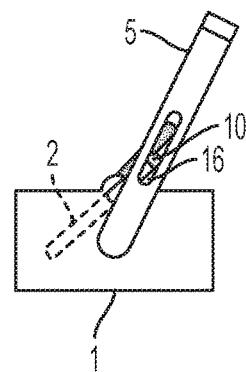
Figure 2E:
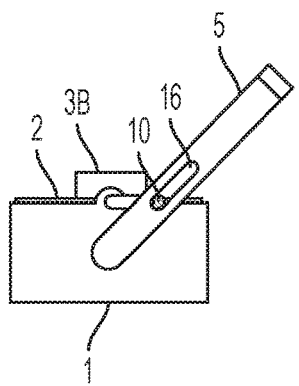

FIGS. 2A through 2E show the sequence of steps in actuating a FIG. 1 embodiment of a two-position RFID switch from one position to the other. So that the movement of internal components may be better understood, cover 4 is omitted from FIGS. 2A-E. As the lever 5 is rotated clockwise, the channel 16 engages the bent end of the axle 10, causing it also to rotate clockwise. FIG. 2A shows the starting point. In FIG. 2B, the handle has been moved some angular distance clockwise. The channel 16 has forced the bent tip of the axle 10 along the channel 16 some distance outward from its starting position. The rotating plate 2 has moved some angular distance clockwise. In FIG. 2C, the lever 5 has been moved approximately 45 degrees and is now vertical. The bent tip handle of the axle 10 is now at its maximum outer position in channel 16. The rotating plate 2 has now rotated 90 degrees. In FIG. 2D, the lever 5 has been rotated almost all the way clockwise. The bent tip handle of the axle 10 is now moving radially inward towards its original position in channel 16. In FIG. 2E, the lever 5 is fully deflected opposite its starting position in FIG. 2A, and the rotating plate 2 is inverted from its starting position, but now again horizontal with respect to the switch base 1. The RFID tag 3A that was detectable in FIG. 2A is now on the underside of the rotating plate, and rendered undetectable, while the previously shielded RFID tag 3B is on top and exposed. The lever 5 has been rotated approximately 90 degrees and through the interaction of the bent end of axle 10 and the channel 16, the rotating plate 2 has rotated 180 degrees. By this means, one RFID tag 3B has been rendered detectable while the other RFID tag 3A has been rendered undetectable.

Figure 3:
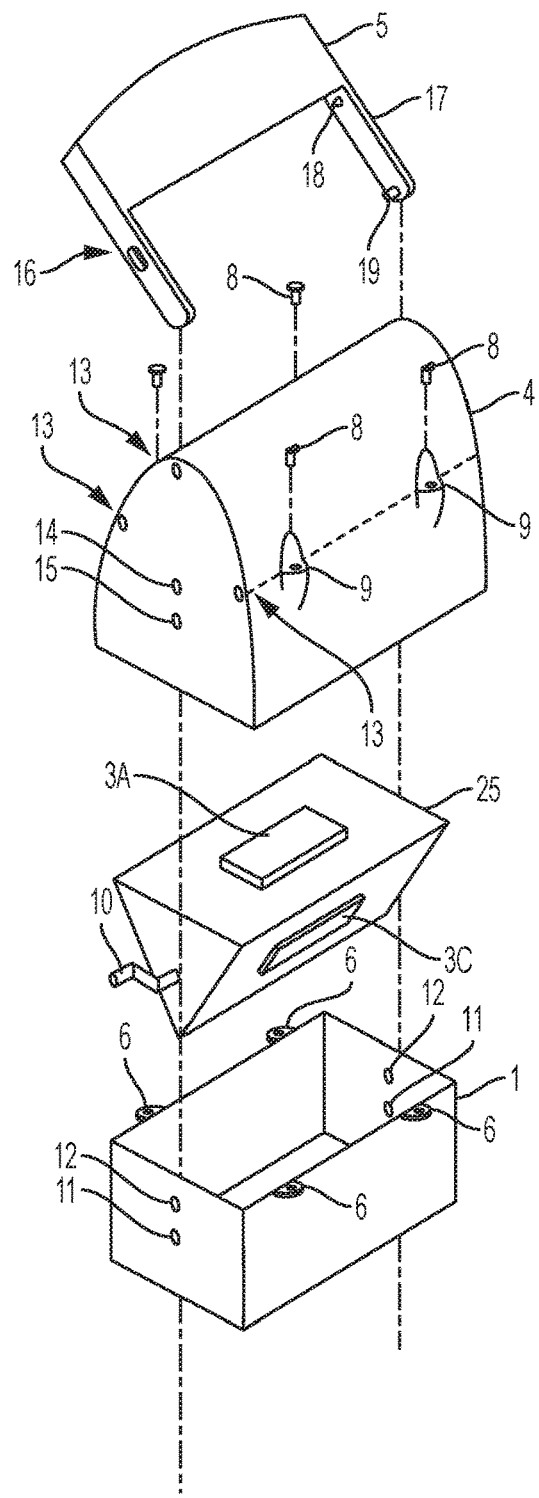
FIG. 3 is an exploded isometric view of an alternative embodiment of a three-position RFID switch.

Referring to FIG. 3, shown is another embodiment of an RFID switch wherein common elements retain the reference numbers of the FIG. 1 embodiment. The FIG. 3 embodiment comprises a switch base 1, rotating tag mount 32, assembly cover 4, and lever 5, henceforth termed a 'three-position RFID switch'. In a preferred embodiment, switch base 1 is a box-shaped container stamped from sheet metal. In a preferred embodiment, rotating tag mount 32 is a hollow triangular prism, the cross-section of which forms an equilateral triangle, stamped from sheet metal, with length slightly smaller than the interior length of switch base 1, and with a maximum width slightly less than the interior width of switch base 1. Three RFID tags (3A, 3B, and 3C) are coupled to the three rectangular faces (25A, 25B, and 25C) of rotating tag mount 25, one on each face, with the center point of each tag 3 coinciding with the center point of one face of rotating tag mount 25. An axle 10 is coupled to the rotating tag mount 25 coinciding with its axis of rotation. Both ends of the axle 10 extend some distance beyond the rotating tag mount 25. Each end of the axle 10 fits into one of the holes 12 on the upper portion of the switch base 1. One end of axle 10 comprises two bends such that a crankshaft is formed, with the outer end parallel to the line formed by the greater portion of axle 10. The opposite end of axle 10 is unbent. Rotating tag mount 25 is coupled to switch base 1 by inserting either end of axle 10 into holes 12 on the upper portion of the switch base 1. By this means, the rotating tag mount 25 forms a lid that precisely covers the switch base 1, and can rotate 360 degrees freely about axle 10. To keep the rotating tag mount 25 from coming loose, a cap 7 is coupled to the unbent end of axle 10.

An assembly cover 4 is coupled to the switch base 1 use a plurality of fasteners 8 pushed through cover holes 9 and fastened to base holes 6. The assembly cover 4 is shaped such that, when coupled to the switch base 1, the rotating tag mount 25 can freely rotate 360 degrees. The assembly cover 4 is formed from an RF-transparent material. In a preferred embodiment, the assembly cover 4 is stamped, molded, or otherwise formed from plastic. A portion of the assembly cover 4 is somewhat visibly transparent (shown in FIG. 3 as the upper portion above the dotted line) such that surface features of the rotating tag mount 25 can be discerned by a user/operator. In a preferred embodiment, each face (25A, 25B, and 25C) of rotating tag mount 25 is a different color such as red, green, and yellow, such that the operator is presented with positive indication of the status switch selection. In another preferred embodiment, each face of rotating tag mount 25 is labeled with words or symbols representing the switch selection affixed to the surface, such that the operator is presented with positive indication of the status selection. A hole 14 formed through one side of the assembly cover 4 coincides with one of the holes 12 on the switch base 1 from which the bent portion of the axle 10 protrudes.

A lever 5 comprises two arms 17 each with a pivot protrusion 19 extending inwards towards one another. The pivot protrusions 19 fit into and through holes 15 on assembly cover 4, and into holes 11 on switch base 1. By this means the lever 10 is caused to rotate around a line extending between holes 11. The bent portion of the axle 10 extends through a channel 16 cut through one of the arms 17 of lever 5, by which means the rotating tag mount 25 is caused to rotate when the lever 5 is rotated. The dimensions of the channel 16 are such that the rotating tag mount 25 can be rotated through a range of 240 degrees, corresponding to all three faces (25A, 25B, 25C) of the rotating tag mount 25. When fully rotated in one direction or the other, or at precisely the midpoint between the two extremes, detent protrusions 18 fit into detent depressions 13, causing the lever 5 to snap into a position and remain there until deliberately moved by a user.

Figure 4A:
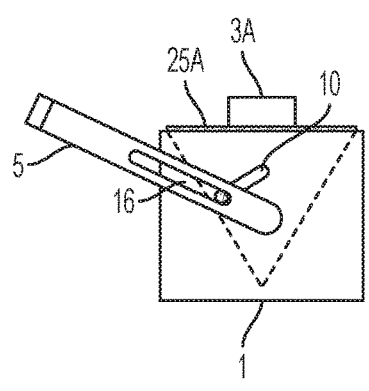
FIGS. 4A through 4E are a series of side views depicting the sequence of steps in operating the embodiment of a three-position RFID switch according to FIG. 3.
Figure 4B:
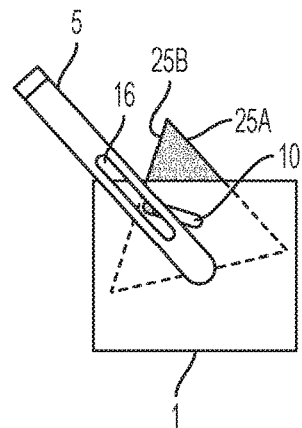
Figure 4C:
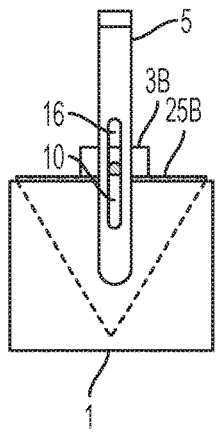
Figure 4D:
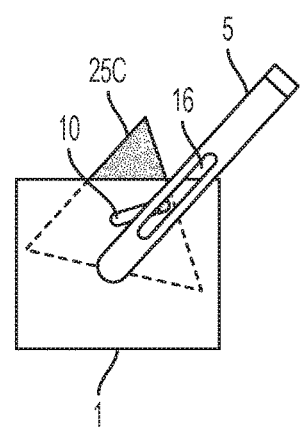
Figure 4E:
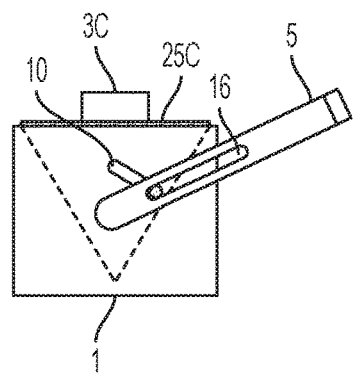
Figure 5A:
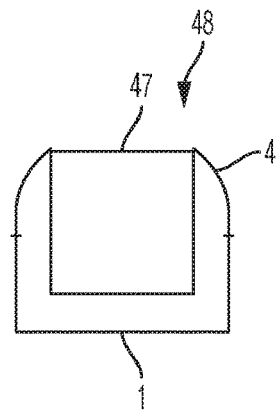
FIGS. 5A through 5E are a set of simplified cross-sections showing rotating tag mounts of various shapes enclosed within RFID switch housing containers of slightly different configurations.
Figure 5B:
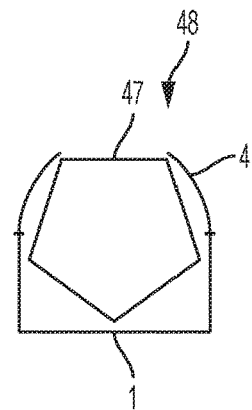
Figure 5C:
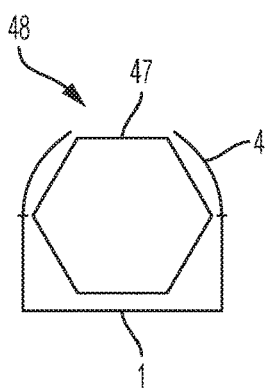
Figure 5D:
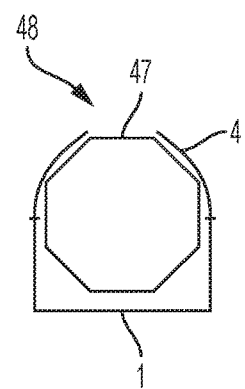
Figure 5E:
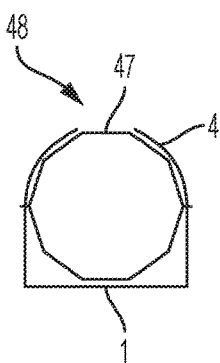

FIGS. 4A through 4E show the sequence of steps in selecting a status with a FIG. 3 embodiment of a three-position RFID switch through three positions. So that the movement of internal components may be better understood, cover 4 and other elements are omitted from FIGS. 4A-E. As the lever 5 is rotated clockwise, the channel 16 engages the bent end of the axle 10, causing it also to rotate clockwise. FIG. 4A shows the starting point with face 25A of tag mount 25 facing upward and exposing RFID tag 3A. In FIG. 4B, the lever 5 has been moved some angular distance clockwise. The channel 16 has forced the bent tip of the axle 10 along the channel 16 some distance radially outward from its starting position. The rotating tag mount 25 has moved some angular distance clockwise. In FIG. 4C, the lever 5 has been moved approximately 60 degrees and is now vertical. The bent tip of the axle 10 is now at its maximum radially outer position in channel 16. The rotating tag mount 25 has now rotated 120 degrees and tag mount face 25B and RFID tag 3B are presented vertically and exposed to RF illumination. In FIG. 4D, the lever 5 has been rotated almost all the way clockwise. The bent tip of the axle 10 is now moving radially inward towards its original position in channel 16. In FIG. 4E, the lever 5 is fully deflected opposite its starting position, and the rotating tag mount 25 is now positioned with face 25C horizontal with respect to the switch base 1 and with RFID tag 3C exposed. The RFID tag 3A that was detectable in frame 1 is now shielded within the switch base 1, and rendered undetectable. The lever has been rotated approximately 120 degrees and through the interaction of the bent end of axle 10 and the channel 16, the rotating tag mount 25 has rotated 240 degrees. By this means, one RFID tag 3C has been rendered detectable while the other two tags 3A and 3B have been rendered undetectable.

While what has been previously described are certain preferred embodiments, it should be apparent to one skilled in the art that other embodiments of an RFID switch can be created in which the cross-section of the rotating tag mount is any equilateral polygon such as a square, pentagon, hexagon, etc., thus allowing a higher number of RFID tags to be mounted and thus a higher number of possible switch status positions. For embodiments that include a rotating tag mount with greater than 3 sides, the switch base may have a shape that allows the rotating tag mount to fully rotate 360 degrees yet may mask all but a single tag. Referring to FIGS. 5A-5E, a number of cross-sections of different embodiments of RFID switches are shown. The equilateral polygon 47 in each frame represents the cross-section of a rotating tag mount 47, designed to rotate about its center point, with an RFID tag (not shown) coupled to each outer face. A lever 5 and axle 10 apparatus (not shown in FIGS. 5A-5E) similar to that previously described facilitates the rotation of each rotating tag mount 47 such that it snaps to discrete positions whereby a desired polygon face and desired RFID tag is exposed to ambient RFID signals while other faces and other RFID tags are shielded within the RF masking switch base.

As can be seen in FIG. 5, as the rotating tag mount 47 incorporates more faces, the switch cover 4 must include an increasingly narrow RF transparent window 48 to ensure that only the topmost face and RFID tag are exposed to RFID signals, and all others are shielded within the RF masking switch base 1 and RF opaque portions of cover 4.

With reference to FIG. 6, a brief overview of one or more embodiments of an improved object tracking system is provided below. An embodiment of the object tracking system 60 comprise an information storage and retrieval system (ISRS) 31 that communicates data with one or more RFID readers 33, one or more RFID antennas 34 that are hard-wired to RFID readers 31, and one or more objects 50 that have RFID tags 37 physically affixed to them. The ISRS 31 has been programmed with three sets of data 32: 1) the names of objects, 2) the unique codes of RFID tags attached to those objects, and 3) the locations of RFID readers and antennas. When operating, the RFID readers 33 continuously transmit/receive and detect any RFID tags 37 that are nearby. Each RFID tag 37 responds with a unique code that is already known to the ISRS 31. The RFID reader 33 and ISRS 31 are in frequent communication with one another, thus, when the RFID reader 33 detects an RFID tag 37, the ISRS 31 is able to associate that RFID tag 37 to a specific object 50. The object tracking system 60 also communicates unique codes related to each RFID reader 33 and each RFID antenna 34, thus, the ISRS 31 knows which reader 33 and which antenna 34 detected the RFID tag 37. From this data, the ISRS 31 is able to derive the approximate location of the RFID-tagged object 50. Data from the RFID tags 37 is used to populate a computer user interface display 30 with information about RFID-tagged objects 50.

By including more than one RFID tag 37 on an RFID switch 36 attached to an RFID-tagged object 50 according to this invention, the selective masking and unmasking of said RFID tags 37 can provide useful functionality for conveying the status of object 50. Typically the RFID tag associated with an object is a presence/absence indicator, from which can be derived knowledge about whether the object is within the workspace, and its approximate location. According to the present invention, an RFID tag 37 could also be associated with an RFID-tagged object 50 to provide status indications in a true/false (or on/off) manner, status examples including: 1) object needs inspection, 2) object is ready to ship, 3) object needs repair, 4) object needs calibration, 5) object is damaged, etc.

While what has been described above are certain preferred embodiments, it should be apparent to one skilled in the art that other embodiments of an RFID switch can be created in which the rotating tag mount is a three dimensional surface that can be rotated around an axis such that only one of a plurality of RFID tags mounted to its outer surface is revealed through the top opening of the container, and thus detectable by a nearby RFID reader. The surface upon which the RFID tag is coupled need not necessarily be flat, nor does the cross-section of the rotating tag mount need be constant along the axis of rotation.

What is claimed is:

1. An RFID switch for transmitting status information chosen by the user to an RFID reader, the RFID switch comprising:
   a housing opaque to RF energy;
   a window transparent to RF energy and located and fixed in the housing;
   an RFID tag located in the housing; and
   the housing and RFID tag are movable relative to each other between a readable condition, wherein the RFID reader can read the RFID tag through the window, and an unreadable condition, wherein the RFID tag is not readable by the RFID reader.

2. An RFID switch according to claim 1, wherein the RFID tag is a first RFID tag, and the RFID switch further comprises a second RFID tag, and the first RFID tag and second RFID tag are located in a first portion of the housing, and the window is located in a second portion of the housing, and the first portion of the housing and the second portion of the housing are movable relative to each other from a first position to a second position, and wherein the first position the first RFID tag is in the readable condition and the second RFID tag is in the unreadable condition, and in the second position the first RFID tag is in the unreadable condition and the second RFID tag is in the readable condition.

3. An RFID switch according to claim 2, wherein the second portion of the housing rotates inside the first portion of the housing and includes a first face and a second face, and the first RFID tag is located on the first face and the second RFID tag is located on the second face, and the second portion of the housing rotates from the first position to the second position, and in the first position the first RFID tag is exposed to the window and second RFID tag is shielded from the window, and in the second position the first RFID tag is shielded from the window and the second RFID tag is exposed to the window.

4. An object tracking and status system for detecting, interpreting and displaying a user selected status of an object in use in a workplace:
   an information storage and retrieval system including a database, and the database associates a first RFID tag with a first status;
   an RFID reader including an RFID antenna operable for scanning the workplace, the RFID reader in communication with the information storage and retrieval system;
   an RFID switch manually operable for selecting status information chosen by the user, the RFID switch including:
   a housing opaque to RF energy and enclosing the first RFID tag;
   a window transparent to RF energy and located and fixed in the housing; and
   the housing and RFID tag are movable relative to each other between a readable condition, wherein the RFID reader can read the first RFID tag through the window, and an unreadable condition, wherein the first RFID tag is not readable by the RFID reader.

5. An object tracking and status system according to claim 4, wherein the database stores a plurality of information from a set of information including: object name information; RFID antenna locations; RFID tag to object associations; and RFID tag to status associations.

6. An object tracking and status system according to claim 4, wherein the RFID tag is a first RFID tag, and the RFID switch further comprises a second RFID tag enclosed in the housing of the RFID switch, and the database associates the second RFID tag with a second status different from the first status; and the RFID housing and the first and second RFID tags are movable relative to each other between a first readable condition and a second readable condition, and in the first readable condition the RFID reader can read the first RFID tag through the window and the second RFID is not readable, and in the second readable condition the first RFID tag is not readable and the second RFID tag is readable by the RFID reader.

7. A method for a user to select and send a status information from an object in use in a workplace to a remote object tracking and status system for detecting, interpreting and displaying the user selected status information; the method comprising:
   providing an information storage and retrieval system including a database, and the database associates a code of a first RFID tag with a first status;
   providing an RFID reader including an RFID antenna operable for scanning the workplace, the RFID reader in communication with the information storage and retrieval system;
   attaching to the object an RFID switch including:
   a housing opaque to RF energy and enclosing the first RFID tag;
   a window transparent to RF energy and located and fixed in the housing; and
   the housing and RFID tag are movable relative to each other between a readable condition, wherein the RFID reader can read the first RFID tag through the window, and an unreadable condition, wherein the first RFID tag is not readable by the RFID reader;
   starting the RFID switch in the unreadable condition;
   moving the RFID switch to the readable condition when the user intends to report the first status;
   reading the code of the first RFID tag with the RFID reader;
   communicating the code of the first RFID tag from the RFID reader to the information storage and retrieval system;
   associating the first RFID tag code to the first status in the database; and
   displaying or acting on the first status.

* * * * *